(12) United States Patent
Hillis et al.

(10) Patent No.: US 8,269,739 B2
(45) Date of Patent: *Sep. 18, 2012

(54) TOUCH DRIVEN METHOD AND APPARATUS TO INTEGRATE AND DISPLAY MULTIPLE IMAGE LAYERS FORMING ALTERNATE DEPICTIONS OF SAME SUBJECT MATTER

(75) Inventors: W. Daniel Hillis, Encino, CA (US); Bran Ferren, Beverly Hills, CA (US)

(73) Assignee: Touchtable, Inc., Pasadena, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/582,611

(22) Filed: Oct. 20, 2009

(65) Prior Publication Data

US 2010/0039446 A1 Feb. 18, 2010

Related U.S. Application Data

(63) Continuation of application No. 11/286,232, filed on Nov. 23, 2005, now Pat. No. 7,724,242, which is a continuation-in-part of application No. 10/913,105, filed on Aug. 6, 2004, now Pat. No. 7,728,821, and a continuation-in-part of application No. 11/188,186, filed on Jul. 22, 2005, now Pat. No. 7,907,124.

(60) Provisional application No. 60/701,892, filed on Jul. 22, 2005.

(51) Int. Cl.
*G06F 3/041* (2006.01)
(52) U.S. Cl. ........................ 345/173; 345/179; 178/18.01
(58) Field of Classification Search .......... 345/156–158, 345/173–179; 178/18.01–18.04, 19.01–19.03; 715/863
See application file for complete search history.

(56) References Cited

U.S. PATENT DOCUMENTS 3,478,220 A 11/1969 Milroy
(Continued)

FOREIGN PATENT DOCUMENTS

EP 0881592 B2 10/2002
(Continued)

OTHER PUBLICATIONS

Wu, et al.; "Gesture Registration, Relaxation, and Reuse for Multi-Point Direct-Touch Surfaces"; Jan. 2006; Proceedings of IEEE International Workshop on Horizontal Interactive Human-Computer Systems (Table Top), Adelaide, South Australia; 8 pages.

(Continued)

*Primary Examiner* — Kimnhung Nguyen
(74) *Attorney, Agent, or Firm* — Michael A. Glenn; Glenn Patent Group

(57) ABSTRACT

An interactive display system, including a touch sensitive display, establishes a first image and at least one secondary image, each image representing various spatial coordinates, the spatial coordinates overlapping at least in part such that each image comprises an alternate depiction of subject matter common to all of the images. The first image is presented upon the display. Responsive to user input including contact with the display, imagery presented by the display is updated to integrate a region of at least one of the secondary images into the display. Each integrated region has substantially identical represented coordinates as a counterpart region of the first image. Further, each integrated region is presented in same scale and display location as the counterpart region of the first image.

13 Claims, 12 Drawing Sheets

U.S. PATENT DOCUMENTS

| | | | |
|---|---|---|---|
| 3,673,327 | A | 6/1972 | Johnson |
| 3,764,813 | A | 10/1973 | Clement |
| 3,775,560 | A | 11/1973 | Ebeling |
| 3,860,754 | A | 1/1975 | Johnson |
| 4,144,449 | A | 3/1979 | Funk |
| 4,245,634 | A | 1/1981 | Albisser |
| 4,247,767 | A | 1/1981 | O'Brien |
| 4,463,380 | A | 7/1984 | Hooks, Jr. |
| 4,507,557 | A | 3/1985 | Tsikos |
| 4,517,559 | A | 5/1985 | Deitch |
| 4,527,240 | A | 7/1985 | Kvitash |
| 4,722,053 | A | 1/1988 | Dubno |
| 4,742,221 | A | 5/1988 | Sasaki |
| 4,746,770 | A | 5/1988 | McAvinney |
| 4,782,328 | A | 11/1988 | Denlinger |
| 5,105,186 | A | 4/1992 | May |
| 5,239,373 | A | 8/1993 | Tang et al. |
| 5,436,639 | A | 7/1995 | Arai et al. |
| 5,448,263 | A | 9/1995 | Martin |
| 5,483,261 | A | 1/1996 | Yasutake |
| 5,512,826 | A | 4/1996 | Hardy et al. |
| 5,528,263 | A | 6/1996 | Platzker et al. |
| 5,982,352 | A | 11/1999 | Pryor |
| 6,008,798 | A | 12/1999 | Mato, Jr. |
| 6,057,845 | A | 5/2000 | Dupouy |
| 6,141,000 | A | 10/2000 | Martin |
| 6,215,477 | B1 | 4/2001 | Morrison |
| 6,232,957 | B1 | 5/2001 | Hinckley |
| 6,333,753 | B1 | 12/2001 | Hinckley |
| 6,335,722 | B1 | 1/2002 | Tani et al. |
| 6,335,724 | B1 | 1/2002 | Takekawa |
| 6,337,681 | B1 | 1/2002 | Martin |
| 6,352,351 | B1 | 3/2002 | Ogasahara |
| 6,384,809 | B1 | 5/2002 | Smith |
| 6,414,671 | B1 | 7/2002 | Gillespie |
| 6,421,042 | B1 | 7/2002 | Omura |
| 6,429,856 | B1 | 8/2002 | Omura |
| 6,504,532 | B1 | 1/2003 | Ogasahara |
| 6,518,959 | B1 | 2/2003 | Ito |
| 6,531,999 | B1 | 3/2003 | Trajkovic |
| 6,532,006 | B1 | 3/2003 | Takekawa |
| 6,563,491 | B1 | 5/2003 | Omura |
| 6,594,023 | B1 | 7/2003 | Omura |
| 6,608,619 | B2 | 8/2003 | Omura et al. |
| 6,636,635 | B2 | 10/2003 | Matsugu |
| 6,654,007 | B2 | 11/2003 | Ito |
| 6,723,929 | B2 | 4/2004 | Kent |
| 6,747,636 | B2 | 6/2004 | Martin |
| 6,764,185 | B1 | 7/2004 | Beardsley |
| 6,765,558 | B1 | 7/2004 | Dotson |
| 6,788,297 | B2 | 9/2004 | Itoh et al. |
| 6,791,700 | B2 | 9/2004 | Omura |
| 6,803,906 | B1 | 10/2004 | Morrison |
| 6,810,351 | B2 | 10/2004 | Katsurahira |
| 6,825,890 | B2 | 11/2004 | Matsufusa |
| 6,828,959 | B2 | 12/2004 | Takekawa |
| 6,888,536 | B2 | 5/2005 | Westerman |
| 6,922,642 | B2 | 7/2005 | Sullivan |
| 6,999,061 | B2 | 2/2006 | Hara et al. |
| 7,339,580 | B2 | 3/2008 | Westerman et al. |
| 7,474,296 | B2 | 1/2009 | Obermeyer et al. |
| 7,724,242 | B2 * | 5/2010 | Hillis et al. ............ 345/173 |
| 7,743,348 | B2 | 6/2010 | Robbins et al. |
| 2001/0019325 | A1 | 9/2001 | Takekawa |
| 2001/0022579 | A1 | 9/2001 | Hirabayashi |
| 2001/0026268 | A1 | 10/2001 | Ito |
| 2002/0036617 | A1 | 3/2002 | Pryor |
| 2002/0185981 | A1 | 12/2002 | Dietz et al. |
| 2003/0001825 | A1 | 1/2003 | Omura et al. |
| 2003/0063775 | A1 | 4/2003 | Rafii et al. |
| 2003/0137494 | A1 | 7/2003 | Tulbert |
| 2003/0231167 | A1 | 12/2003 | Leung |
| 2004/0046744 | A1 | 3/2004 | Rafii et al. |
| 2005/0052427 | A1 | 3/2005 | Wu et al. |
| 2006/0022955 | A1 | 2/2006 | Kennedy |
| 2006/0026521 | A1 | 2/2006 | Hotelling et al. |
| 2006/0026536 | A1 | 2/2006 | Hotelling et al. |
| 2006/0031786 | A1 | 2/2006 | Hillis |
| 2007/0252821 | A1 | 11/2007 | Hollemans et al. |
| 2007/0268273 | A1 | 11/2007 | Westerman et al. |
| 2008/0211785 | A1 | 9/2008 | Hotelling et al. |

FOREIGN PATENT DOCUMENTS

| | | |
|---|---|---|
| EP | 0881591 B1 | 9/2003 |
| JP | 2001/175807 | 6/2001 |

OTHER PUBLICATIONS

Wu, Mike et al. Multi-Finger and Whole Hand Gestural Interaction Techniques for Multi-User Tabletop Displays; ACM CHI Letters, 5(2); 193-202. ACM UIST 2003 Symposium on User interface Software & Technology, Vancouver, Canada; Nov. 2003; pp. 193-202.

NCSA (National Center for Supercomputing Applications); GM Slab Function; Jul. 10, 2003; Johnson and Curtis Univ. of Illinois.

Smart Board for Flat Panel Displays (interactive Overlay); Nov. 2003; Smart Technologies Inc.

Rekimoto, Jun; "SmartSkin: An Infrastructure for Freehand Manipulation on Interactive Surfaces"; Apr. 2002; CHI 2002; Minnesota, USA;retrieved from website: http://www.csl.sony.co.jp/person/rekimoto/smartskin/.; Interaction Laboratory Sony Computer Science Laboratories, Inc.

Paradiso and Strickon; "The Laser Wall"; Sep. 1997; MIT Media Lab; http://web.media.mit.edu/~joep/SpectrumWeb/captions/Laser.html.

Small, Charles H.: "Touchscreens Provide a Robust and Intuitive User Interface"; May 24, 2002; TechOnline; www.techonline.com/showArticle.jhtml?articleID=192200401&queryText=touch+screen.

NCSA (National Center for Supercomputing Applications) GM Slab Console; Jul. 10, 2003; Johnson and Curtis Univ. of Illinois.

"Diamond Touch Applications" Mitsubishi Electric Research Laboratories; Aug. 2, 2004.

* cited by examiner

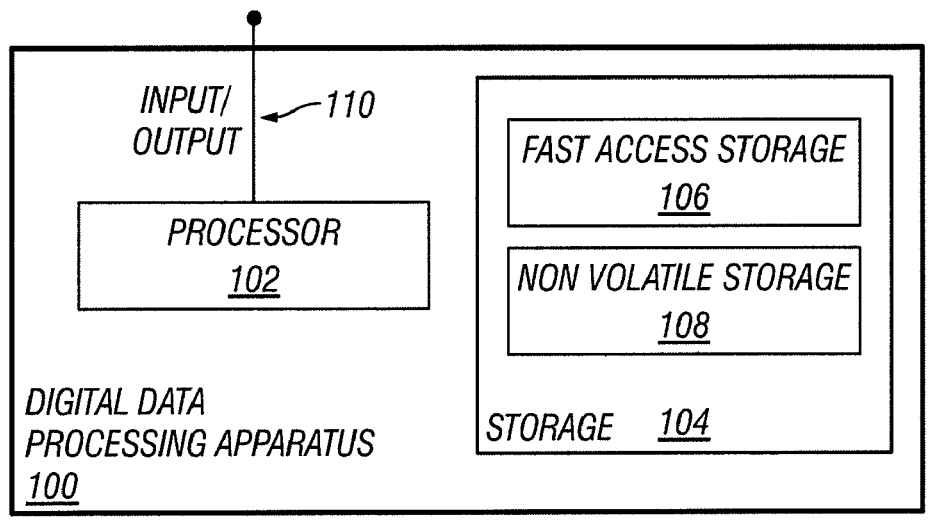
FIG. 1D
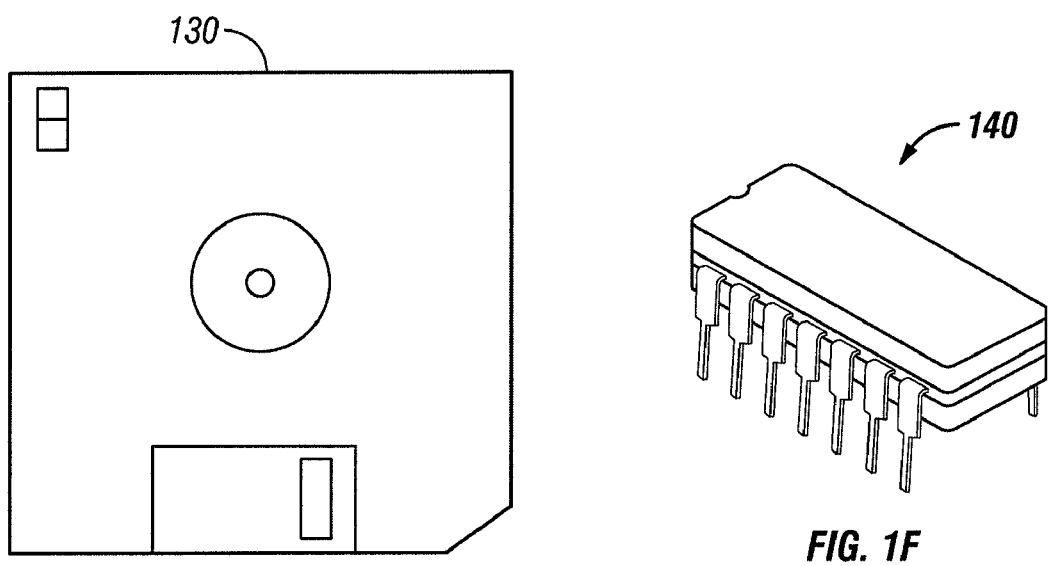
FIG. 1E
FIG. 1F

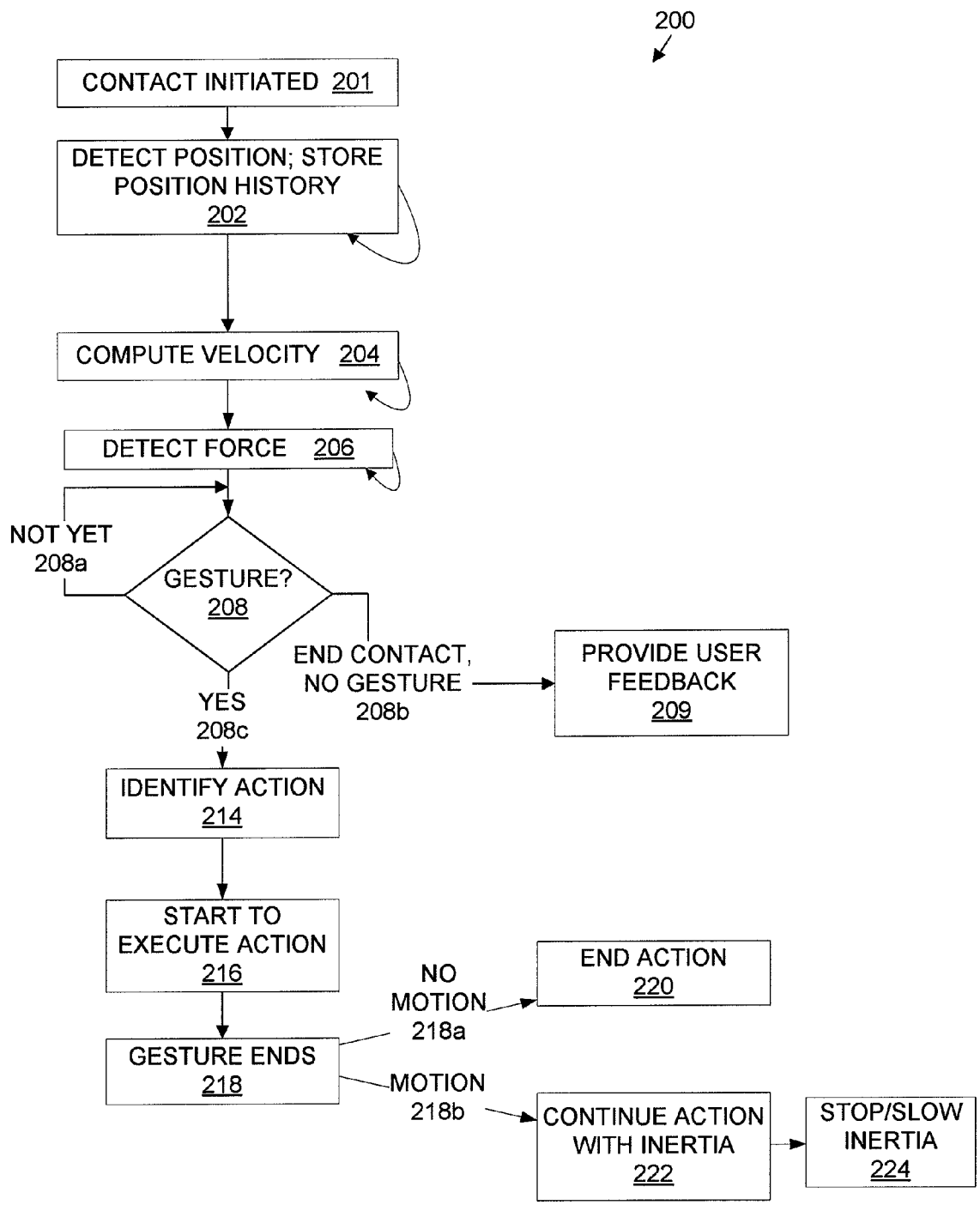

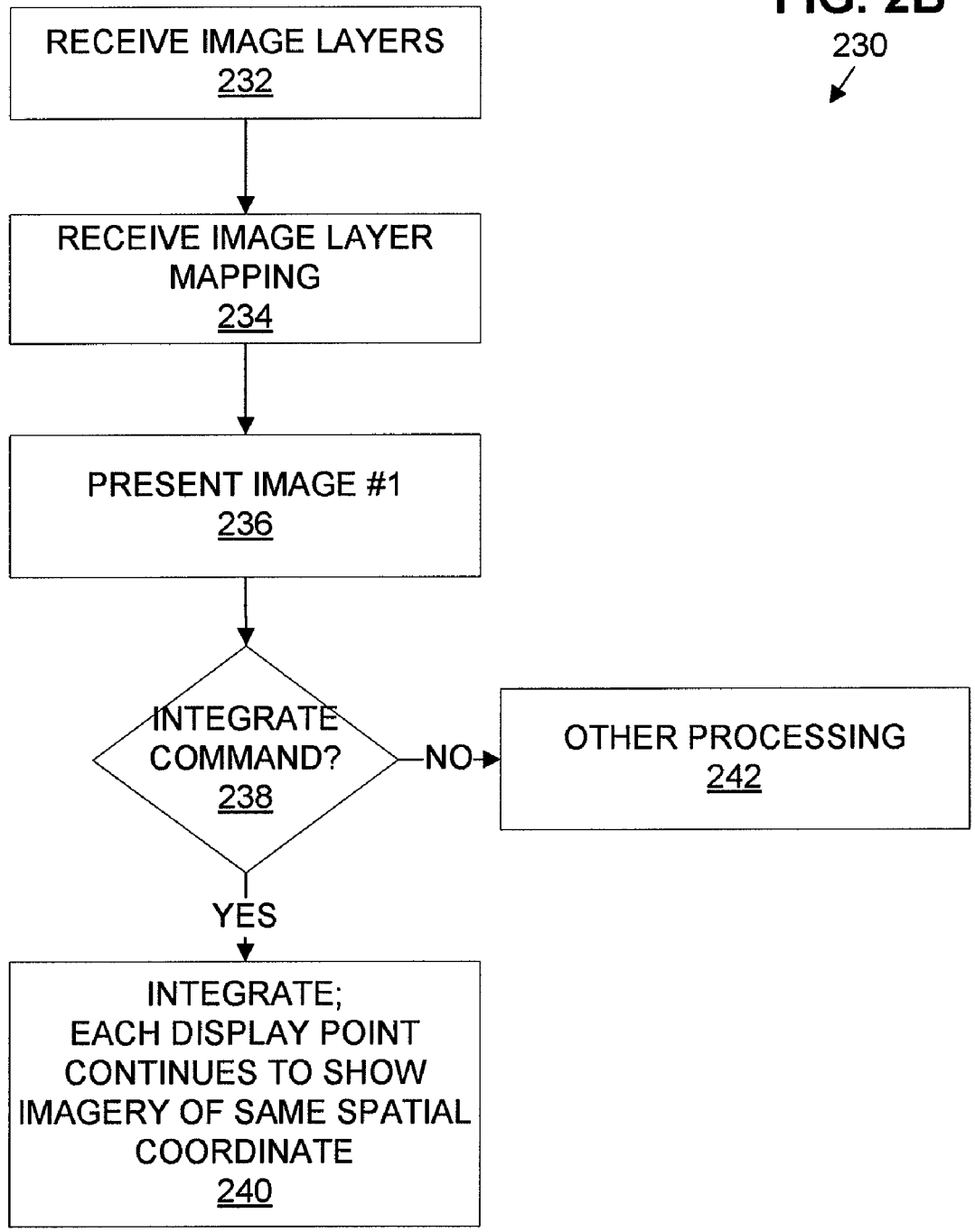

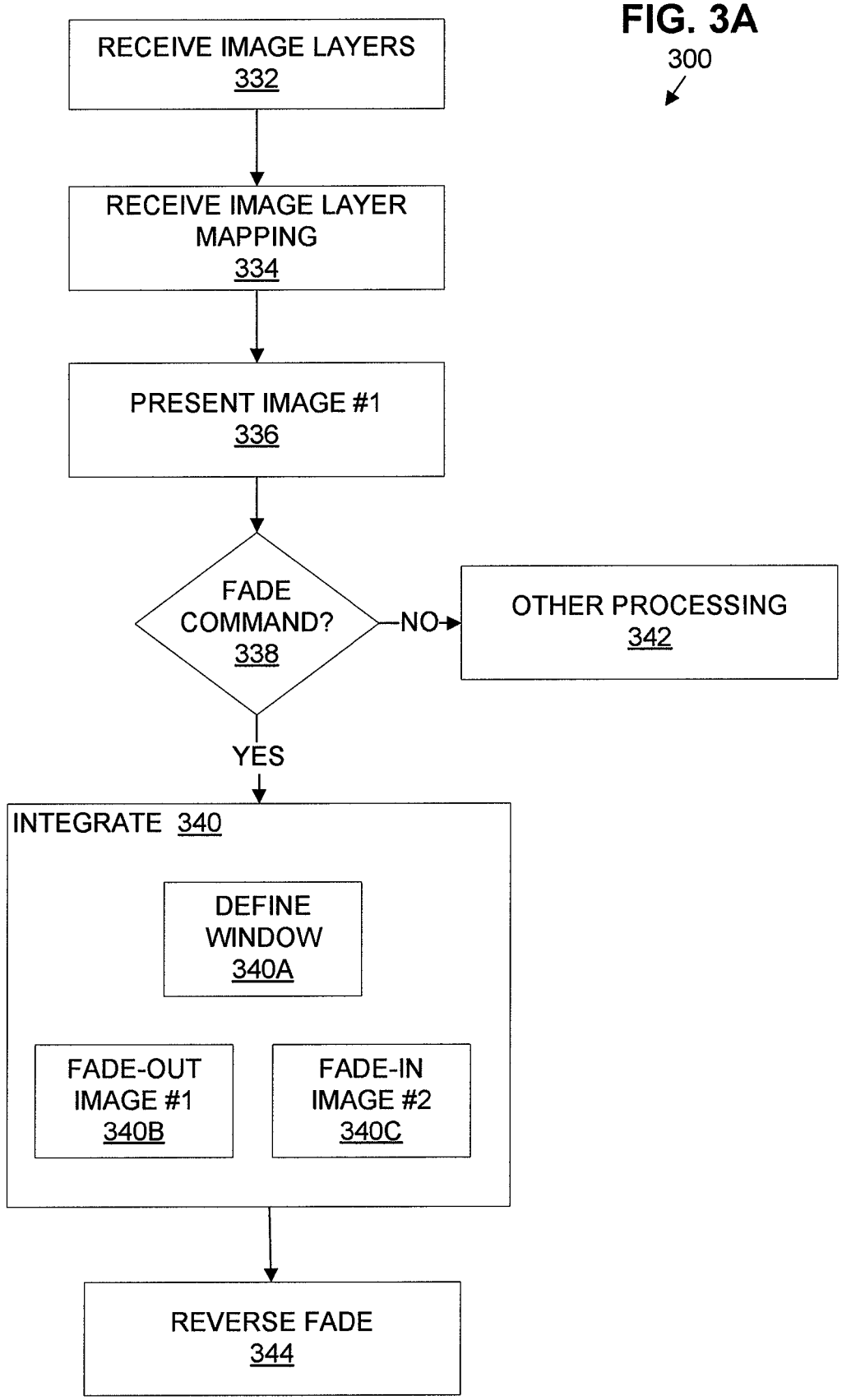

TOUCH DRIVEN METHOD AND APPARATUS TO INTEGRATE AND DISPLAY MULTIPLE IMAGE LAYERS FORMING ALTERNATE DEPICTIONS OF SAME SUBJECT MATTER

CROSS-REFERENCE TO RELATED APPLICATIONS

This application is a continuation of the following application, and claims the benefit thereof in accordance with 35 USC 120: U.S. application Ser. No. 11/286,232 entitled TOUCH DRIVEN METHOD AND APPARATUS TO INTEGRATE AND DISPLAY MULTIPLE IMAGE LAYERS FORMING ALTERNATE DEPICTIONS OF SAME SUBJECT MATTER, filed on Nov. 23, 2005 in the name of W. Hillis et al. The '232 application is a continuation-in-part of the following earlier filed, copending applications and claims the benefit thereof in accordance with 35 USC 120: U.S. patent application Ser. No. 10/913,105 entitled "Touch Detecting Interactive Display" filed on Aug. 6, 2004 in the names of W. Daniel Hillis and Bran Ferren; U.S. patent application Ser. No. 11/188,186 entitled "Method And Apparatus Continuing Action Of User Gestures Performed Upon A Touch Sensitive Interactive Display In Order To Simulate Inertia" filed on Jul. 22, 2005 in the names of W. Daniel Hillis and Bran Ferren. The '232 application also claimed the benefit under 35 USC 120 of the following application: U.S. Provisional Application No. 60/701,892 entitled "Interactive Display Technologies" filed on Jul. 22, 2005 in the names of W. Daniel Hills et al. The entirety of each aforementioned application is hereby incorporated by reference.

BACKGROUND OF THE INVENTION

1. Field of the Invention

The present invention relates to interactive display systems whose presentation is controlled through user performed touch. More particularly, the invention concerns various embodiments of method, apparatus, signal-bearing medium, and logic circuitry used in implementing an interactive display system that responds to user touch to selectively integrate different layers of imagery comprising alternate depictions of same subject matter.

2. Description of the Related Art

In many cases, a situation arises calling for user review of several alternate depictions of the same subject matter. For example, a city planner may seek to review a satellite photograph in conjunction with a graphical map depicting the same region. In another example, an architect may be interested in reviewing and correlating different floor plans of the same section of building. Similarly, a circuit designer may be motivated to gain understanding into the interrelationship between different layers of a multi-layer integrated circuit. Although the focus in each case is the same subject matter, there differing depictions that contrast by camera angle, time of view, level of a multi-layer structure, or other parameter.

Traditionally, people have reviewed such data in physical form, such as photographs, blueprints, diagrams, and the like. In this case, the reviewer must mentally assimilate alternate depictions of the common subject matter by aligning the depictions side-by-side, shuffling through them, etc. Another traditional vehicle for reviewing such data is the computer. With a computer, the reviewer can change from document to document (shuffling review), or view documents in separate windows (side-by-side review).

Although the foregoing approaches will always enjoy some popularity, the present inventors have sought ways to improve the interface between humans and computers.

SUMMARY OF THE INVENTION

An interactive display system, including a touch sensitive display, establishes a first image and at least one secondary images, each image representing various spatial coordinates, the spatial coordinates overlapping at least in part such that each image comprises an alternate depiction of subject matter common to all of the images. The first image is presented upon the display. Responsive to user input including contact with the display, imagery presented by the display is updated to integrate a region of at least one of the secondary images into the display. Each integrated region has substantially identical represented coordinates as a counterpart region of the first image. Further, each integrated region is presented in same scale and display location as the counterpart region of the first image.

BRIEF DESCRIPTION OF THE DRAWINGS

FIG. 1D is a block diagram of a digital data processing machine.

FIG. 1E shows an exemplary signal-bearing medium.

FIG. 1F shows exemplary logic circuitry.

FIG. 2A is a flowchart of a generalized sequence for operating a multi-user touch sensitive interactive display system.

FIG. 2B is a flowchart of a sequence for operating an interactive touch display system to integrate different layers of imagery comprising alternate depictions of same subject matter.

FIG. 3A shows a flowchart of exemplary operations to operate an interactive touch display system to effectuate a multi-layer fade mode.

DETAILED DESCRIPTION

The nature, objectives, and advantages of the invention will become more apparent to those skilled in the art after considering the following detailed description in connection with the accompanying drawings.

Hardware Components & Interconnections

Overall Structure

Figure 1A:
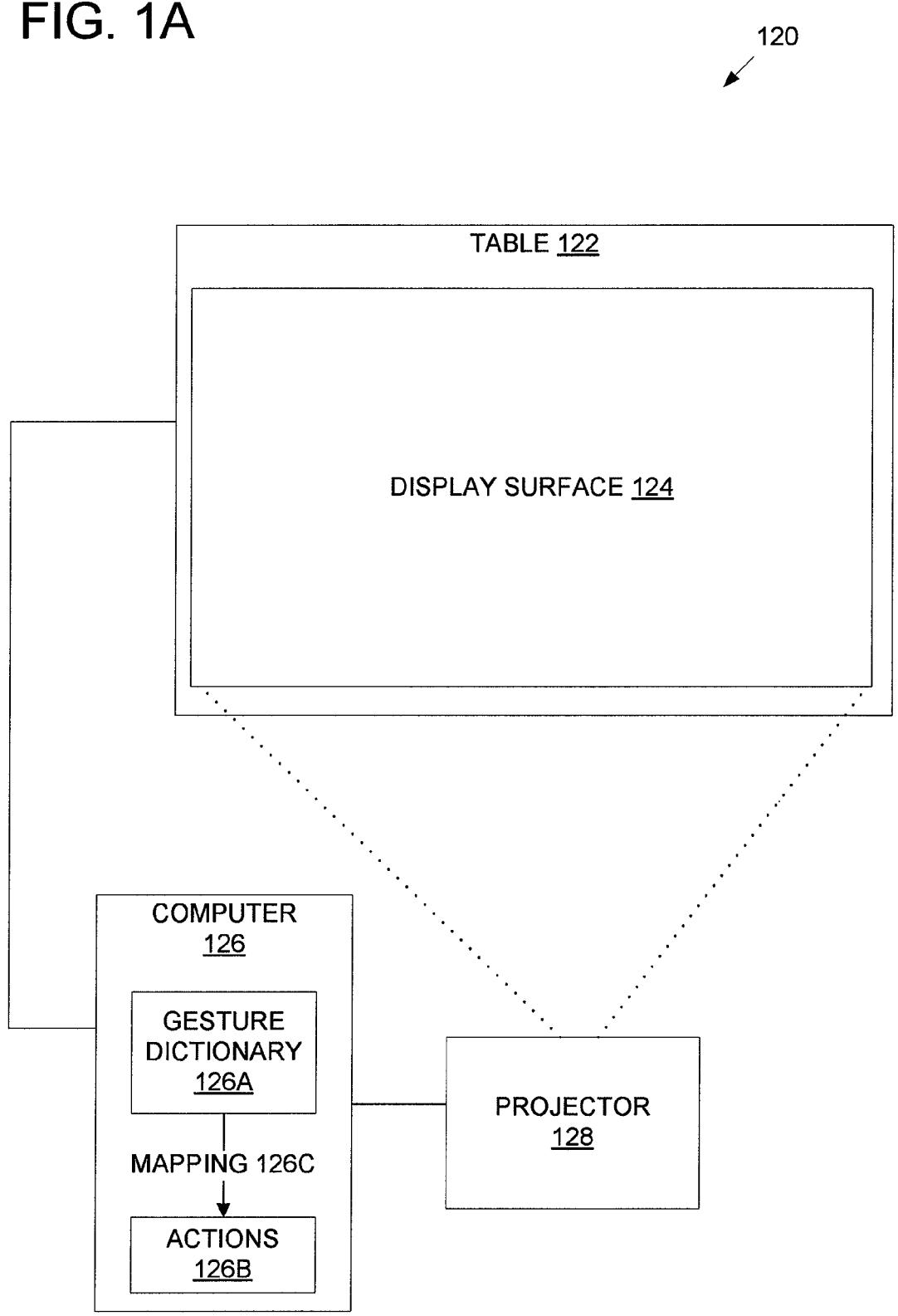
FIG. 1A is a block diagram of the hardware components and interconnections of an interactive multi-user touch sensitive interactive display system.

One aspect of the present disclosure concerns an interactive touch detecting display system, which may be embodied by various hardware components and interconnections, with one example being described in FIG. 1A. The system 120 includes a table 122 with a display surface 124, computer 126, and projector 128. The projector 128 projects imagery upon the display surface 124 under direction of the computer 126. As one example, the system 120 may be implemented by a touch detecting interactive display as disclosed in U.S. patent application Ser. No. 10/913,105, the entirety of which is incorporated by reference.

The table 122 detects touch input from human users as applied to the display surface 124, and provides a representative output to the computer 126, indicating the position, size, timing, and other characteristics of the user's touch. Optionally, the table 122 may also detect applied force. Based upon this information, the computer 126 identifies one or more user gestures from a predefined set of defined gestures, and further identifies an action associated with each identified gesture. In this respect, the computer 126 includes a gesture dictionary 126a, listing of actions 126b, and mapping 126c between gestures and actions. The computer 126 interprets the table 122's output by utilizing the dictionary 126a to identify the gesture performed by the user. The computer 126 then carries out appropriate action 126c corresponding to the user-performed gesture. The actions 126c comprise, for example, predetermined machine executable operations for updating imagery presented by the display.

The presently described embodiment of the system 120 facilitates user manipulation of the projected imagery as a whole, for example, through operations such as panning, zooming, rotating, and the like. This contrasts with personal computer applications, which utilize numerous separately movable icons. Still, the system 120 may utilize one or more peripheral menus or other control interfaces to support user manipulation of the subject imagery. Accordingly, the system 120 is particularly well suited to hands-on, intuitive, collaborative, multi-user study and manipulation of a large unitary item of imagery such as a photograph or map, presented upon the display 124.

Figure 1B:
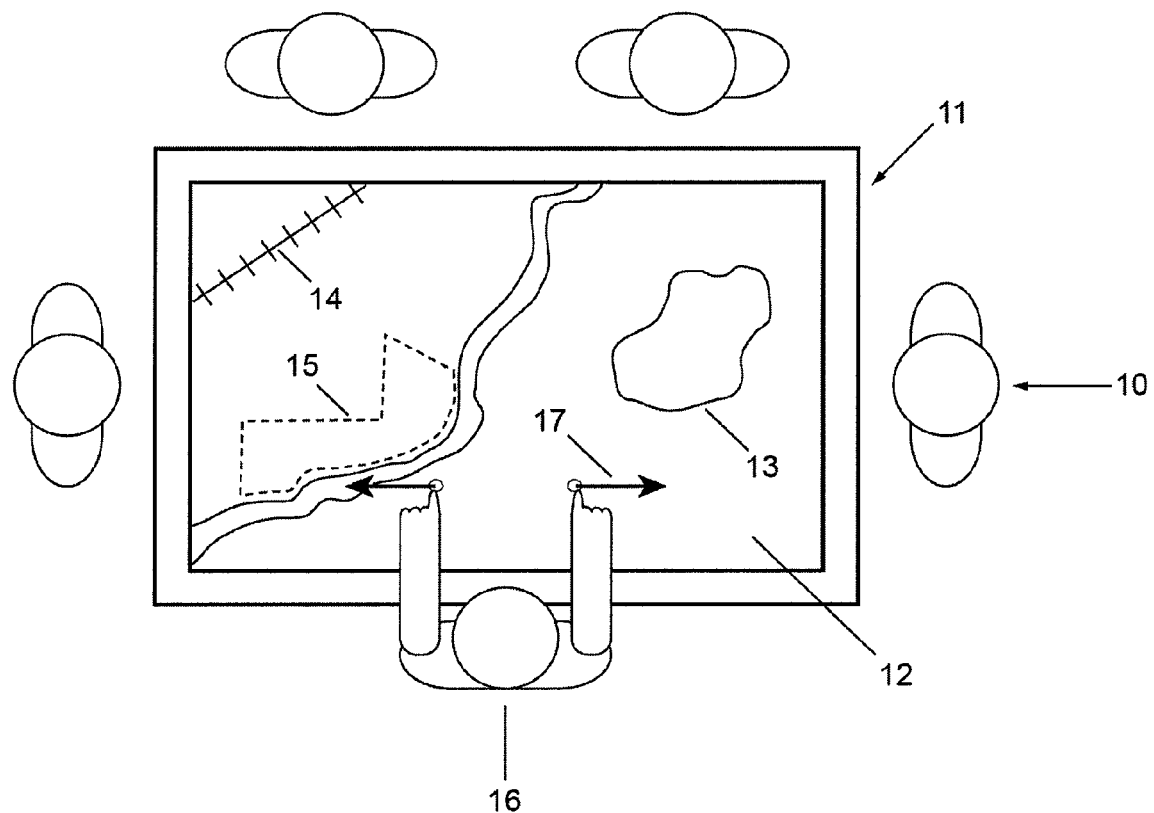
FIG. 1B is a plan view showing several users operating an interactive, touch detecting display.

In this respect, FIG. 1B shows several users operating an interactive, touch detecting display 11. The users 10 surround the display 11, such that each user can view the display surface 12, which shows imagery of interest to the users. For example, the display may present Geographic Information System (GIS) imagery characterized by geographic 13, economic 14, political 15, and other features, organized into one or more imagery layers. Because the users can comfortably surround and view the display, group discussion and interaction with the display is readily facilitated. In the example of FIG. 1B, a user 16 has gestured by placing his fingertips on the display surface and moving them in an outwardly separating manner. As discussed in greater detail below, this particular gesture 17 is associated with a zoom-in command. When the computer 126 performs a zoom-in command, it directs the projector to provide 128 a closer, more detailed view of the displayed imagery.

Figure 1C:
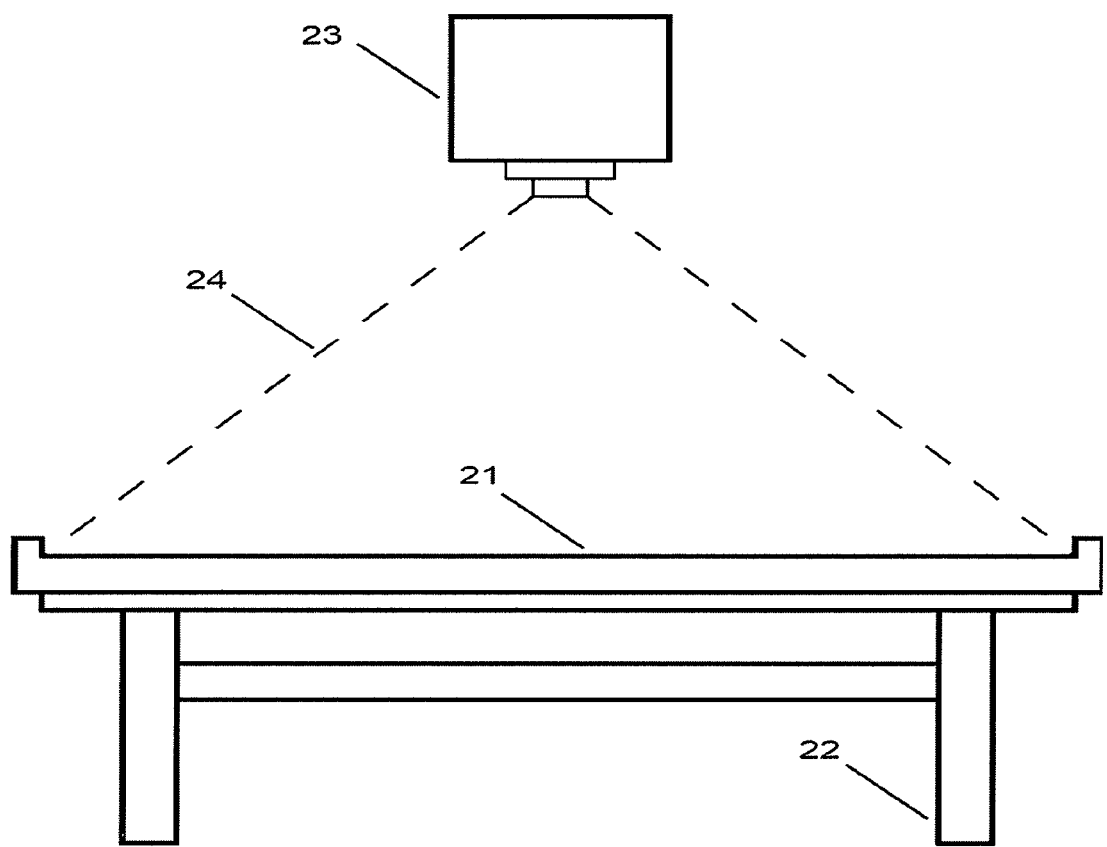
FIG. 1C shows a side view of an interactive, touch detecting, tabletop projection display.

FIG. 1C shows a side view of the components 124, 128. The display surface is a horizontally oriented, planar projection surface 21 supported by a table-like structure 22. The structure in this example supports the projection surface at waist level for adult users, allowing the users to view and touch the entirety of the projection surface comfortably. The displayed imagery is generated by a projector 23 located above and projecting 24 downward onto the projection surface.

While projection from above onto a horizontally oriented display is illustrated, this disclosure also contemplates other display surface orientations, projector configurations, and display technologies. For example, a horizontally oriented rear-projection surface may be used as the display surface, with the projector mounted below the display surface and projecting upward. This approach offers the advantage of eliminating the shadows generated in those configurations where a user may position his body between the projector and the projection surface. The display may also be mounted in a vertical orientation and affixed to a wall or other supporting structure. In this nonprojection case, thin profile display technologies may be most appropriate, such as LCDs, OLEDs, or plasma displays, although those skilled in the art will appreciate that many display technologies may be used.

A possible consequence of the horizontal orientation of the display surface is a natural inclination of users to rest a hand on the projection surface for support, especially when leaning forward to point to objects near the center of the projection surface. To avoid erroneously interpreting such contact with the display as a gesture, the projection surface may be surrounded by a small railing (not shown). The railing provides a visual cue that discourages users from leaning onto the display, and also provides structural support should the user wish to lean forward towards the center of the display.

Referring to FIG. 1A, the table 122 may employ various approaches to detect of when and where a user touches the display surface. In one embodiment, a set of infrared emitters and receivers (not shown) is arrayed around the perimeter of the display surface 124, oriented such that each emitter emits light in a plane a short distance above the display surface. The table 122 determines the location where the user is touching the projection surface by considering which emitters are and are not occluded as viewed from each of the receivers. A configuration incorporating a substantially continuous set of emitters around the perimeter and three receivers, each positioned in a corner of the projection surface, is particularly effective in resolving multiple locations of contact.

As an alternative, the table 122 may employ a resistive touch pad, such as those commonly used in laptop computers, placed beneath the display surface 124, which is flexible. The resistive touch pad comprises two layers of plastic that are separated by a compressible insulator such as air, and a voltage differential is maintained across the separated layers. When the upper layer is touched with sufficient pressure, it is deflected until it contacts the lower layer, changing the resistive characteristics of the upper to lower layer current pathway. By considering these changes in resistive characteristics, the computer 126 can determine the location of contact.

In yet another embodiment, the table 122 employs a thin layer of liquid crystal film or other material that changes optical properties in response to pressure. The thin layer is placed beneath the display surface 124, which is flexible. One or more video cameras trained on the underside of the material capture the changes in optical properties that occur when a user touches the projection surface and therefore applies pressure to the thin layer. The location of contact is then determined by using the computer 126 to analyze the video camera images.

In still another embodiment, the table 122 employs ultrasound to detect contact information. Capacitive touch pads may also be used, with one example being the Synaptics TouchPad™ product. A variety of capacitive touch pads are available commercially, and described in various publications. As another example, the display surface 124 may employ another scheme such as ultrasound, or a combination of any of the foregoing. Furthermore, the table 122 may employ a combination of some of the foregoing schemes, such as IR together with ultrasound.

In any case, the detection scheme employed by the table 122 periodically provides a machine readable location output signal to the computer 126, which in turn analyzes the location information to identify user gestures. Depending upon the implementation, the table output may comprise a raw signal corresponding to the physics of the detection mechanism, or a more refined signal indicative of actual contact position. Thus, the computer 126 may serve to interpret the table's output to develop a Cartesian or other representation of touch position.

As an optional enhancement, the display surface 124 may be mounted on load cells or other devices that sense force of the user contact on the display surface 124. As described in greater detail below, the computer 126 may employ the detected force to supplement the identification of gestures. One example, illustrated below in greater detail, permits the user to apply force to slow imagery that has been set in motion using simulated inertia. Similarly, the computer 126 may also use force intensity to determine the gain or attenuation applied to the velocity used to carry out the identified gestures.

Exemplary Digital Data Processing Apparatus

Data processing entities such as the computer 126 may be implemented in various forms. One example is a digital data processing apparatus, as exemplified by the hardware components and interconnections of the digital data processing apparatus 100 of FIG. 1D.

The apparatus 100 includes a processor 102, such as a microprocessor, personal computer, workstation, controller, microcontroller, state machine, or other processing machine, coupled to storage 104. In the present example, the storage 104 includes a fast-access storage 106, as well as nonvolatile storage 108. The fast-access storage 106 may comprise random access memory ("RAM"), and may be used to store the programming instructions executed by the processor 102. The nonvolatile storage 108 may comprise, for example, battery backup RAM, EEPROM, flash PROM, one or more magnetic data storage disks such as a hard drive, a tape drive, or any other suitable storage device. The apparatus 100 also includes an input/output 110, such as a line, bus, cable, electromagnetic link, or other means for the processor 102 to exchange, data with other hardware external to the apparatus 100.

Despite the specific foregoing description, ordinarily skilled artisans (having the benefit of this disclosure) will recognize that the apparatus discussed above may be implemented in a machine of different construction, without departing from the scope of the invention. As a specific example, one of the components 106, 108 may be eliminated; furthermore, the storage 104, 106, and/or 108 may be provided on-board the processor 102, or even provided externally to the apparatus 100.

Signal-Bearing Media

In contrast to the digital data processing apparatus described above, a different aspect of this disclosure concerns one or more signal-bearing media tangibly embodying a program of machine-readable instructions executable by such a digital processing apparatus. In one example, the machine-readable instructions are executable to carry out various functions related to this disclosure, such as the operations described in greater detail below. In another example, the instructions upon execution serve to install a software program upon a computer, where such software program is independently executable to perform other functions related to this disclosure, such as the operations described below.

In any case, the signal-bearing media may take various forms. In the context of FIG. 1D, such a signal-bearing media may comprise, for example, the storage 104 or another signal-bearing media, such as a magnetic data storage diskette 130 (FIG. 1E), directly or indirectly accessible by a processor 102. Whether contained in the storage 106, diskette 130, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), or other suitable signal-bearing media including analog or digital transmission media and analog and communication links and wireless communications. In one embodiment, the machine-readable instructions may comprise software object code, compiled from a language such as assembly language, C, etc.

Logic Circuitry

In contrast to the signal-bearing media and digital data processing apparatus discussed above, a different embodiment of this disclosure uses logic circuitry instead of computer-executed instructions to implement processing entities of the system 120. FIG. 1F shows exemplary logic circuitry 140. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

OPERATION

Having described the structural features of the present disclosure, the operational aspect of the disclosure will now be described. One operational aspect of the disclosure involves the identification of particular touch-based user gestures from points of contact, velocity, and/or applied force, and implementing of predetermined actions associated with the gestures. A different aspect concerns the operation of an interactive display system that responds to user touch to selectively integrate different layers of imagery comprising alternate depictions of same subject matter.

Although the present invention has broad applicability to touch based computing systems, the explanation that follows will emphasize the application of FIGS. 1A-1C in order to tangibly explain a useful example, without any intended limitation.

Gesture Recognition & Execution

FIG. 2A shows a sequence 200 to detect and analyze contact points, history, velocity, and/or applied force to recognize user application of predefined touch-based user gestures, and thereafter implement predetermined actions pre-associated with the recognized gestures. As described in further detail below, optional features such as inertia, touch initiated object slowing, friction, and others may be implemented. For ease of explanation, but without any intended limitation, the example of FIG. 2A is described in the context of the interactive touch input system of FIGS. 1A-1C.

Broadly, the steps 202, 204, 206 run continuously to process user contact with the display surface 124 as it occurs. Steps 202, 204, 206 therefore serve to analyze contact occurring when the user contacts the surface 124 at one or more contact regions utilizing one or more fingers, hands, arms, etc. As explained in greater detail below, step 208 analyzes the history of position, velocity, force, and other touch characteristics to recognize when the user has performed a recognized "gesture."

The sequence 200 is now described in greater detail. As an example, the sequence 200 may be initiated upon boot up, reconfiguration, initialization, or other startup of the system 120. In step 201, the user initiates (and the display/computer detects) the user's physical contact with the display surface 124. Without any intended limitation, the illustrated embodiment of the sequence 200 performs one instance of the (repeating) steps 202-204 for each such contact initiated. The contact of step 201 is referred to as the "current" contact. In one gesture recognition scheme, the computer 126 tracks a predetermined number of distinct contact locations (such as two). If the computer identifies another contact location (such as a third), the computer 126 ignores it until the user releases a sufficient number of the existing contact locations.

In step 202, the table 122 detects and monitors the position, size, shape, and timing of the current contact region. Namely, the table 122 provides a machine readable output to the computer 126, which is representative of the position, size, shape, and timing of each contact region, or contains information from which this information can be calculated or derived. The timing output may be satisfied, for example, by the table 122 providing its output in real time. Also in step 202, the computer 126 stores a position history for each contact region. The position history provides a record of how each contact region moves or and/or changes shape over time.

In step 204, the computer 126 computes and monitors the velocity (if any) of the subject contact that is occurring by analyzing the contact's position history. The computed velocity may comprise an instantaneous velocity, average velocity over some or all of the past, moving average, or other suitable computation.

In step 206, the table 122 detects and monitors the force by which the current user contact is being applied. As a specific example, this may occur by the table 122 detecting applied pressure of the current contact (utilizing a mechanism such as load cells, solid state force sensors, or other devices), or by assuming that applied force increases or decreases proportionally to the size of the contact region. To provide some examples, step 206 may be performed concurrently with step 202, in series (as shown), or omitted entirely. Also in step 206, the table 122 provides a machine-readable output to the computer 126, this signal representing the detected force or containing information by which force can be derived or computed.

In step 208, the computer 126 determines whether activity of the current contact matches a predetermined pattern, and therefore constitutes a "gesture." Step 208 repeats continually, utilizing some or all of the position, position history (movement), velocity, and force information from steps 202, 204, 206. More particularly, in step 208 the computer 126 compares the history of contact position, size, movement, velocity, and/or force to the dictionary 126a of predetermined gestures to determine if the user has performed any of these gestures.

As long as the current contact continues, but no gesture has been detected, step 208 repeats (via 208a). If the current contact ends but no gesture is detected (208b), then the computer 126 may optionally provide feedback to the user that an attempted gesture was not recognized (step 209). Feedback may be provided, for example, by audible alert, visual alert, error log, etc. In contrast, if step 208 detects that the user has initiated a gesture (208c), the computer in step 214 utilizes the mapping 126c to identify the action 126b associated with the gesture that was identified in step 208. As mentioned above, the predefined actions include various machine implemented operations for updating the presentation of imagery by the display. In one embodiment, gestures are both identified (208) and associated (214) with display control commands via a single procedure.

After step 214, the computer 126 initiates performance of the identified action (step 216). As described in greater detail below, some examples of actions 126b include panning, zooming, rotating, and the like. Thus, step 216 starts the requested pan, zoom, rotate, or other operation.

In step 218, the computer/display detects that the current gesture has ended because the user terminated contact with the display. In a simple embodiment, the computer 126 may respond to termination of the current gesture by ending the associated action (step 220). However, by simulating physical properties, such as inertia and friction, the system 120 can more closely approximate the look and feel of manipulating a physical object. An important consequence of these properties is that motion of the displayed imagery can continue, and subsequently cease, after the initiating points of contact are removed. Therefore, in step 218 the computer 126 considers whether the gesture terminated with a non-zero velocity. In other words, step 218 determines whether, at the moment the user ended the current gesture by terminating contact with the display surface, the contact region was moving. Step 218 may conclude that the gesture ended with motion if there was any motion whatsoever, or step 218 may apply a predetermined threshold (e.g., one inch per second), above which the contact region is considered to be moving.

If the current gesture ended with a zero velocity (or a nonzero velocity that did not meet the threshold), then step 218 progresses (via 218a) to step 220, where the computer 126 terminates the action being performed for the subject gesture. In contrast, if the current gesture ended with a non-zero velocity, step 218 advances (via 218b) to step 222, which executes the action in a manner that imparts inertia to the action.

For example, if the action identified in step 214 was "rotate," then the computer 126 in step 222 directs the projector 128 to additionally continue the requested rotation after the gesture terminates. In one embodiment, the imparted inertia may be proportional to the nonzero velocity at gesture termination (computed at 204), which may serve to simulate continuation of the motion that was occurring when the gesture terminated.

Another example is where the computer 126 detects (FIG. 2, step 208) that the user has initiated a pan gesture by drawing a finger across the display surface at a particular velocity, and lifted his/her finger from the surface while still moving (FIG. 2, step 218b). With the optional inertia feature enabled, the computer 126 continues (FIG. 2, step 222) to pan the imagery in the initiated direction at the velocity implied by the gesture at the time the finger was lifted until a stopping or slowing naturally occurs (step 224). If the velocity when the finger was lifted is low, the computer 126 pans the display at a correspondingly slow rate, useful for slowly panning across imagery. Alternatively, if the computer 126 detects a panning gesture terminated at a rapid velocity, the computer 126 quickly translates the imagery in the desired direction, without the need for repeated panning gestures to continue movement. The computer 126 similarly recognizes user termination of other gestures with residual velocity, such as rotation and zoom, with inertia continuing the appropriate motion until stopped.

With various techniques, the routine 200 may slow the imparted inertia as illustrated by step 224. For example, without user contact, the computer 126 may slow the inertia at a predetermined rate to simulate friction. As another example, upon new user contact after terminating the gesture with inertia, the computer 126 may (1) slow the inertia in proportion to force exerted by the user, the size of the contact area, or other properties, (2) abruptly terminate the inertia, thus bringing the motion of the imagery to an immediate stop, (3)

terminate the inertia and immediately impart a motion correlating with the new contact, or (4) perform another action.

One example of a slowing gesture (step 224) comprises placing the finger or hand on the display surface, as if stopping a spinning globe. In response to this gesture, the computer 126 may slow movement at a rate that is proportional to the force with which the gesture is applied or to the area of contact. For example, responsive to the user lightly touching a finger, the computer 126 will cause "drag" and gradually slow the motion. Likewise, responsive to a firmer touch or wider area of contact (such as a whole hand), the computer 126 more briskly slows the motion, or immediately stops entirely. This graduated response is useful when, for example, the imagery is panning at high speed and the desired location is approaching. Thus, the user can gently slow down the display with a light touch then press firmly when the location is reached. In an alternative embodiment, the computer 126 ceases motion at the first tap or other touch.

In one embodiment, the computer 126 is responsive to user input to enable, disable, and/or adjust the above described inertia, friction, and such properties. For example, a simulated friction coefficient governs the degree to which the imagery motion slows over time. With the friction coefficient is set to zero or inactive, the computer 126 utilizes a simulated friction of zero, and continues motion at the initiated velocity until stopped by the user through a stopping gesture. In contrast, with the friction coefficient set to a nonzero value, the computer 126 slows the motion of the imagery at the given rate. The computer 126 may also recognize an adjustable threshold for determining motion (218) or no motion (218b).

Integrating Multiple Image Layers

FIG. 2B shows a sequence 230 to illustrate one example of a multi-layer application of this disclosure. For ease of explanation, but without any intended limitation, the operations of FIG. 2B are described in the hardware context of the interactive touch input system of FIGS. 1A-1C.

Although the following sequence 230 may be implemented as part of the gesture recognition and implementation sequence 200 (or it may incorporate the sequence 200), the sequence 230 may also be implemented independent of the sequence 200. For ease of discussion, sequence 230 has been described as a standalone product, although certain steps of the sequence 230 utilize operations similar to those of sequence 200 (such as steps 201-206). In this case, details such as inertia (218-224), sensing velocity and force (204, 206), and other such details may be adopted or left out of the implementation of sequence 230 as appropriate to the particular application.

Broadly, the sequence 230 functions as follows. The system 120 receives a first image and at least one secondary images. Each image represents various spatial coordinates, which overlap at least in part; thus, each image is an alternate depiction of subject matter common to all of the images. The sequence 230 presents the first image on the display 124. Responsive to user input including contact with the display, the sequence 230 updates the displayed imagery to integrate a region of one (or more) of the secondary images into the display. Each integrated region has substantially identical represented coordinates as a counterpart region of the first image. Further, each integrated region is presented in same scale and display location as the counterpart region of the first image.

The following is a more particular discussion of the sequence 230, with particular reference to FIG. 2A. In step 232, the display system 120 receives, defines, creates, modifies, formats, or otherwise establishes multiple images. Each image represents various spatial coordinates, which overlap at least in part; thus, each image is an alternate depiction of subject matter common to all of the images. Each image may be referred to as an image "layer", since the images comprise alternate depictions of the same subject matter. Some examples of depicted subject matter include a scene, a physical object, a building, a section of earth, city, area of earth topography, machine, or virtually any other subject matter capable of representation by visual images.

In one example, the images depict the subject matter at different times. In another example, the images depict different levels of a subject matter with multiple levels, such as planes of circuitry, floor plans of a multi-story building, strata of earth, etc. In another example, the images differ in that some form an actual depiction of subject matter (such as a photograph) and others provide a logical, artistic, computer graphic, or man-made representation of the subject matter (such as a road map). Images in various combinations of the foregoing may also be used.

Each image represents various spatial coordinates, and all images' spatial coordinates include at least some common coordinates. For example, all images may represent the same extent of latitude and longitude. As a different example, the images may represent different extents of latitude/longitude, with these extents nevertheless sharing some portions in common.

In step 234, the system 120 receives one or more mappings that define how the images interrelate. As mentioned above, each image represents various spatial coordinates. The mappings state the relationship between each image and its represented spatial coordinates. Some exemplary spatial coordinates include latitude/longitude, polar coordinates, Cartesian coordinates, mathematical translation between points or lines or borders in an image to spatial coordinates, or virtually any other technique for correlating an image with the content that is being represented. In one embodiment, the mappings are embodied in lookup tables, linked lists, databases, files, registers, or another data structure. In another embodiment, each image layer's mappings are incorporated into that image, for example, by displayed latitude/longitude values, hidden coordinate values, document metadata, or another system. Simply stated, the mappings provide a scale-free, content independent translation between each image layer and the represented spatial coordinates. In the event the mappings are incorporated into the images themselves, then step 234 is carried out when step 232 is performed.

In step 236, the system 120 presents a first one of the images on the display surface 124. The first image may be a first one of the images if they are ordered, an arbitrary one of the images, a default image according to system or user-supplied settings, etc. The remaining, un-displayed images are referred to as secondary images.

In step 238, the system determines whether it has detected user input including an integrate command. The integrate command may be provided via on-screen menu entry, mouse click, off-screen input, on-screen gesture, voice command, foot pedal, or any other user input mechanism, device, or method. In a simple example, the user supplies the integrate command by touching the display surface 124.

If step 238 did not receive the integrate command, the system 120 performs various other processing in step 242. For example, in step 242 the system may determine (208a) whether other input than the integrate command has been received, and if so, process such input accordingly.

On the other hand, if step 238 detected an integrate command, then step 240 integrates the images in a certain way. More specifically, the system 120 updates imagery presented by the display, namely the first image per step 236, to integrate one or more of the other (not currently displayed) images into the display. More particularly, step 240 updates the displayed imagery to integrate a region of at least one of the secondary images into the display. Each integrated region has substantially identical represented coordinates as a counterpart region of the first image. For example, if the integrated region corresponds to Colorado, then the counterpart region of the first image is also Colorado. Stated in another way, the part of the second image that is being integrated into the display corresponds to a given part of the first image pursuant to the spatial coordinates. Moreover, each integrated region is presented in same scale and display location as the counterpart region of the first image. The integrated region of the second image (and counterpart region of the first image) may comprise the entire images or subparts of the respective images.

As described in greater below, the integration of step 240 may be carried out in various ways. In one embodiment (FIG. 3A), the system 120 responds to the integrate gesture by performing a fade-out of the first image and a fade-in of one or more secondary images, as if the secondary images were initially hidden beneath the first image (in perfect alignment, and the same scale). In another embodiment (FIG. 4A), the system 120 responds to the integrate gesture by opening a user defined, virtual window in the first image, through which the corresponding portion of one or more secondary images is viewed. In another embodiment (FIG. 5A), the system 120 responds to the integrate gesture by interpolating or "morphing" between the first image and one or more secondary images in proportion to user movement of a "slider" tool depicted on the display surface 124. The embodiments of FIGS. 3A, 4A, and 5B are discussed in detail below.

Figure 3B:
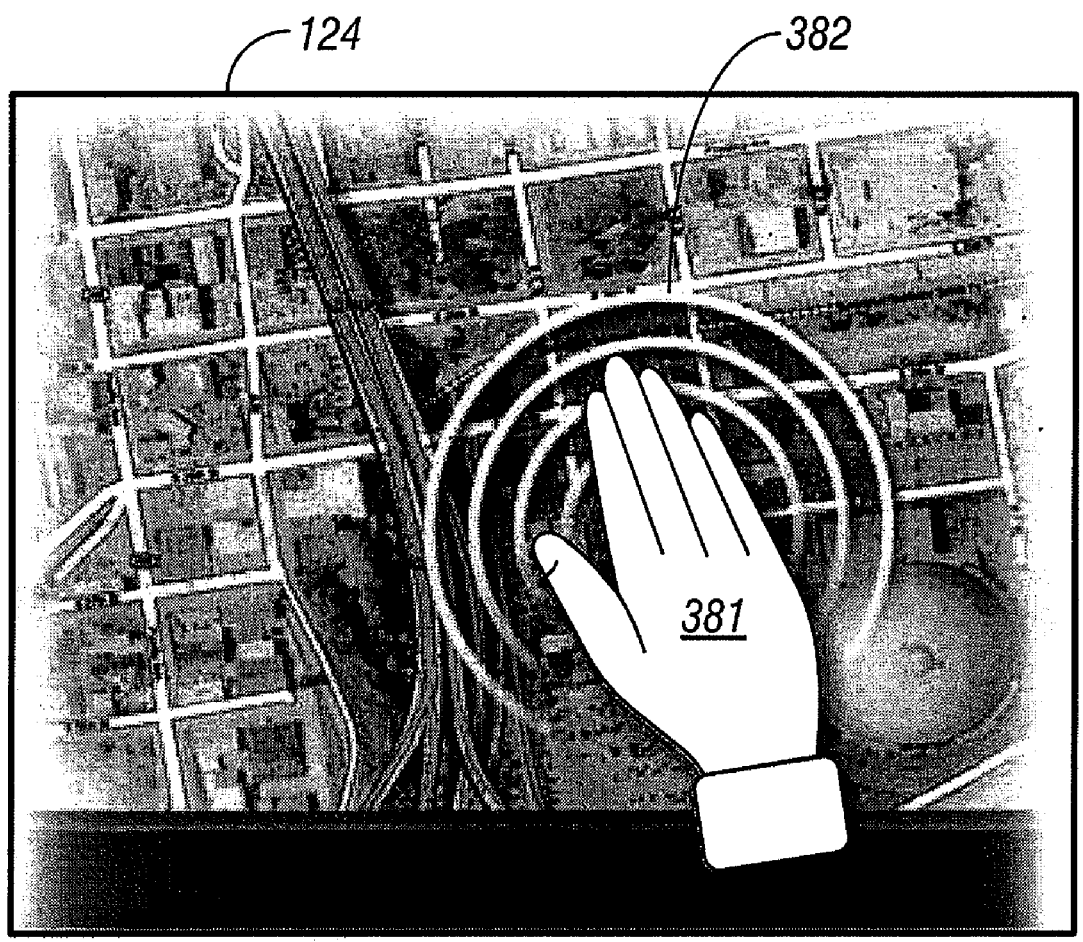
FIG. 3B is a diagram showing an example of user participation in a fade mode.
Figure 4A:
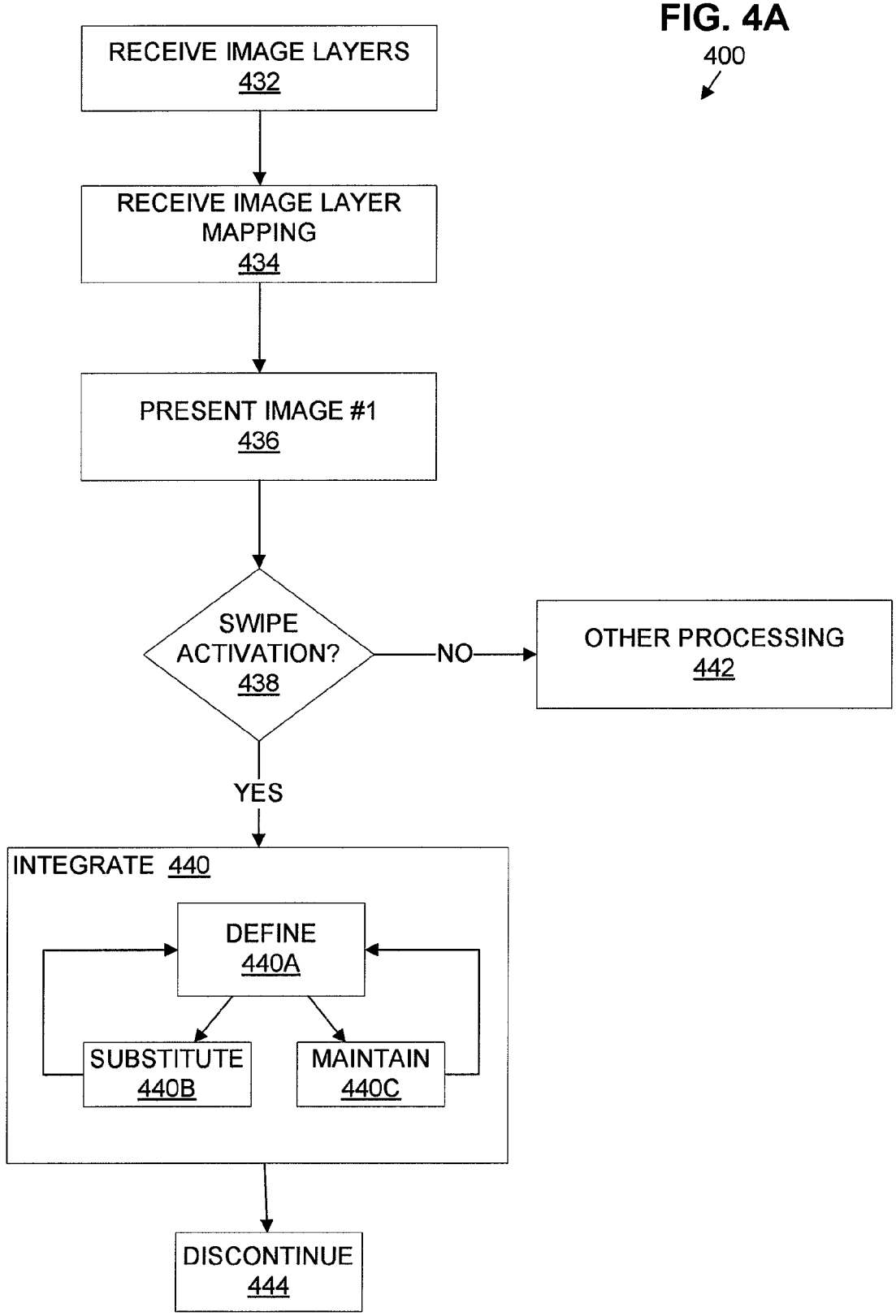
FIG. 4A is a flowchart of exemplary operations to operate an interactive touch display system to effectuate a swipe mode.
Figure 5A:
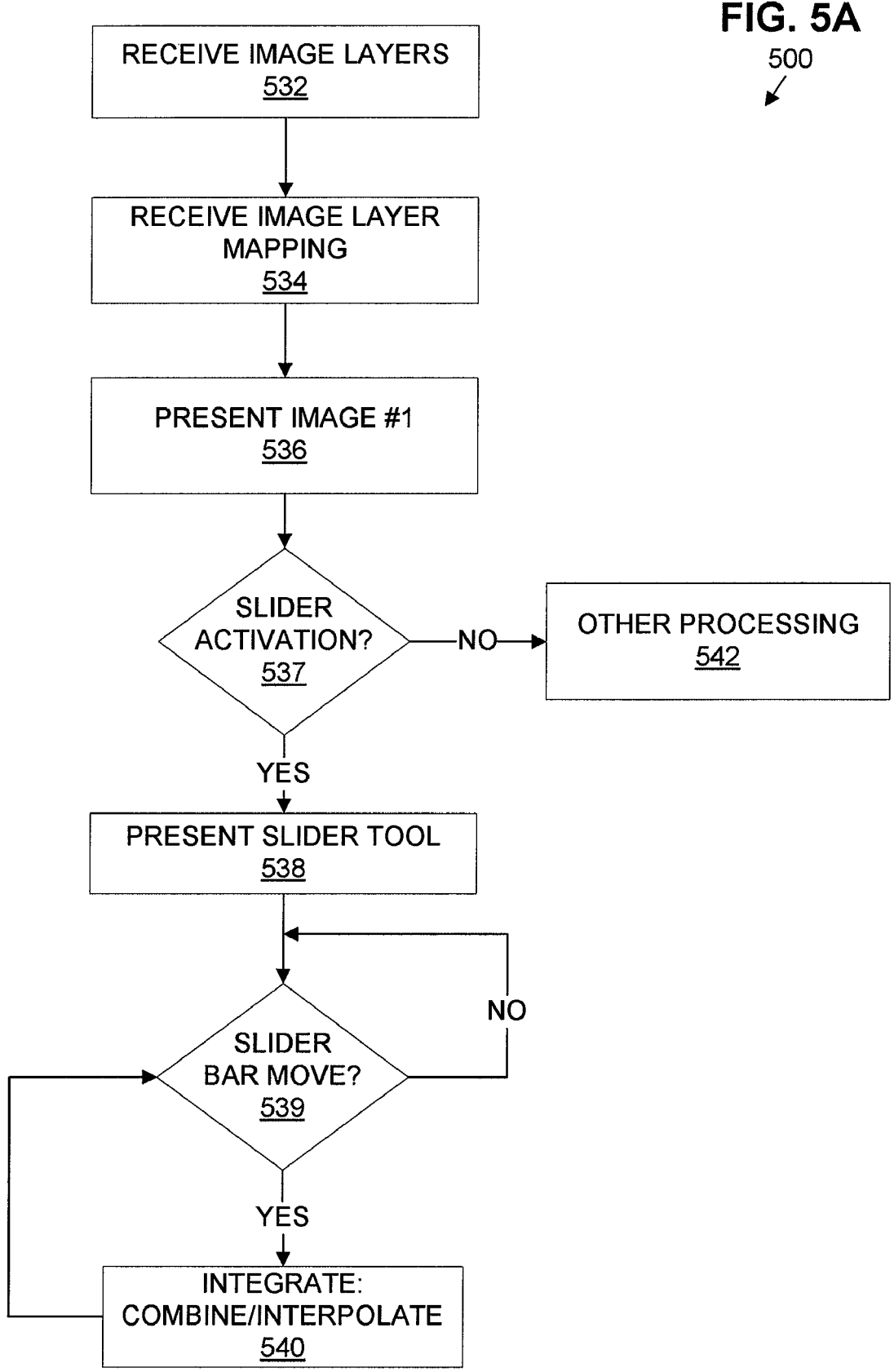
FIG. 5A is a flowchart of exemplary operations to operate an interactive touch display system to effectuate a slider mode.
Figure 5B:
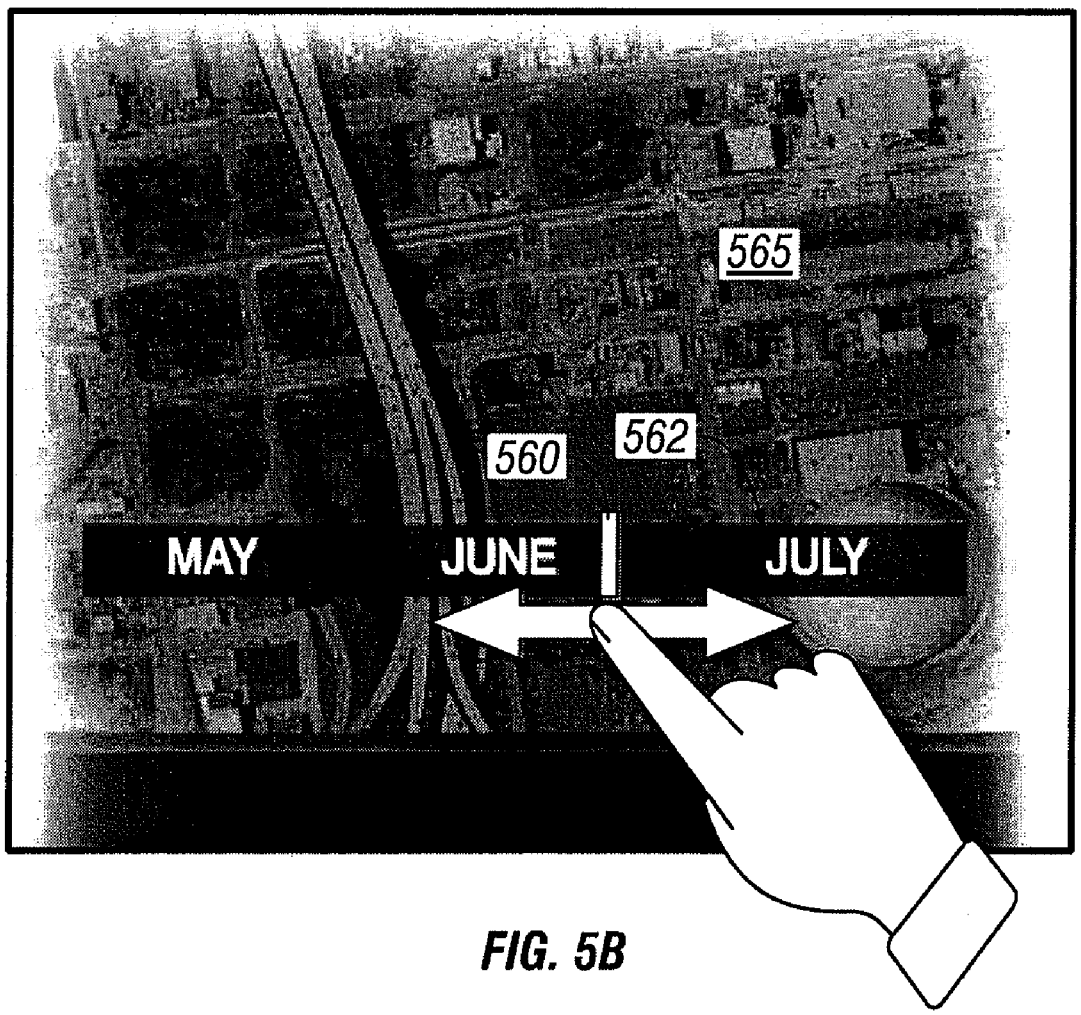
FIG. 5B is a diagram showing an example of user participation in a slider mode.

Introduction to FIGS. 3A, 4A, 5A

FIGS. 3A, 4A, 5A shows respective sequences 300, 400, 500 to illustrate various multi-layer embodiments. Although each sequence may be implemented as part of the gesture recognition and implementation sequence 200, or vice versa, each sequence may also be implemented independent of the sequence 200. For ease of discussion, each sequence 300, 400, 500 is described as a standalone product, although certain steps of each sequence may utilize operations similar to those of sequence 200 (such as steps 201-206). For ease of explanation, but without any intended limitation, the aforementioned sequences are described in the hardware context of the interactive touch input system of FIGS. 1A-1C.

Fade Application

Broadly, the fade mode sequence 300 serves to "fade" from an initially displayed image to one or more initially images that are not initially displayed; this is performed in response to user touch applied to the display screen. The images are displayed in situ, so that each point on the display screen continues to show the same spatial coordinates regardless of which image is being shown.

Steps 332, 334, 336 receive image layers, receive mapping, and present the first image in the same manner as steps 232, 234, 236 described above (FIG. 2B). In order to present the first image in step 336, an image-display mapping is developed between the first image and the display surface 124 to present the image with the desired scale. Such image-display mappings are well known components of computer graphics software and require no further description here, mention being made merely to aid in discussion of the fade window below.

Step 338 detects whether the user has supplied a predetermined fade command. The fade command may be input by any type of user-to-computer input device or methodology, such as activating a predetermined selection of a GUI menu or other functional interface followed by manually contacting the display surface 124. In the present embodiment, the fade command is detected whenever the user performs a predefined fade gesture comprising application of a predetermined threshold force to the display surface 124 with a sufficiently small velocity (e.g., less than a prescribed threshold velocity).

If the system 120 detects other input than the predefined fade command, various other processing 342 is performed, such as waiting for performance of a gesture, providing an error message to the user, or other operations such as those discussed above in context of steps 208a, 209, etc. of FIG. 2B.

On the other hand, when the system 120 detects the fade command, step 340 performs an act of integrating 340 the images. This involves defining a fade window (340a), fading-out the first image (step 340b), and fading-in a second image (step 340c).

The fade window may be defined (340a) in various ways, with some examples of fade window including: (1) the entire display surface, (2) a predefined size and shape of window established by user selection or default settings, (3) a shape and size of window surrounding the point of user contact and proportional to the size, shape, and/or force of user contact with the display surface 124, or (4) another arrangement entirely.

As mentioned above, steps 340b-340c involve reducing visibility of the first image inside the fade window (340b), and increasing visibility of a second image within the fade window (340c). In other words, steps 340b-340c reduce visibility of a region of the first image corresponding to the fade window, and increase visibility of the second image through the fade window as if the second image were residing beneath the first image (and aligned therewith according to the applicable mappings). In making the transition of steps 340b-340c, one implementation is to utilize the image-display mapping to determine which spatial coordinates of the first image are bounded by the fade-window (such as by latitude/longitude), and then to use the mapping of step 334 to identify the same region in the second image. Inside the fade window, the identified region of the first image is subject to fade-out, and the identified region of the second image is subject to fade-in.

In an exemplary embodiment, steps 340b-340c may be performed by the computer 126 reacting to user input by specifying appropriate transparency values of each image layer, and inputting them into an appropriate computer graphics program, mapping program, rendering program, or other such program for generating an output on the display 124. For instance, each image is initially (e.g., step 336) assigned a transparency value indicative of the image's level of fade-in or fade-out. For instance, in step 336, the first image has a transparency level of 0% and all other images have a transparency level of 100%. The system 120 displays each image according to its present transparency level. In this embodiment, steps 340b-340c are performed by simultaneously increasing the transparency value for the first image layer and decreasing the transparency level for the second image.

In performing the fade-out (340b) and fade-in (340c), the system 120 may operate to provide a rate of change in transparency that is proportional to the force applied (e.g., more force, more fade). Furthermore, the system 120 may automatically return to the presentation of the original image when the user force is removed or falls below a given threshold.

The subject matter depicted by the second image displayed in the window matches the subject matter formerly depicted by the first image in the window (albeit, removed when the fade occurred). Therefore, steps 340b-340c have the presentation effect of fading from the first image to the second image. Optionally, fade-in and fade-out may be largely or precisely inversely proportional to provide a smooth transition. Fading may occur across the entire display surface, or within a limited window smaller than the display 124. Despite the use of the term "fade," transition from one image to the next may be abrupt, or may involve gradually lessening the presentation of one image while gradually increasing the next in proportion to default settings, user-defined settings, size or force of user contact applied, etc. Furthermore, the system 100 may regulate the degree of fade in proportion to a parameter such as the amount of user force applied at the contact site.

In the event there are greater than two images, steps 340b-340c involves a fade from first image to second, third, and further images that represent successive slices of the depicted subject matter in a particular order (such as higher layers to lower layers, etc.). In this embodiment, the images may therefore compose a series of images having a defined order. In this embodiment, the image layers' transparency is determined by the amount of user force applied to the display surface 124. For example, steps 340b-340c may favor higher layers with lesser applied force, etc. In one embodiment, transition between layers occurs smoothly, by interpolating between layers during transition between them; in a different embodiment, transition is abrupt, where only one layer has 100% transparency at a given time and all other layers have 0% transparency.

In step 344, the fade operation of step 340 is reversed. In one example, the fade is partially or completely reversed in response to lessening or removal of user contact with the display surface. In other examples, fade may be reversed upon passage of a default or user-defined time, upon user performance of another prescribed gesture, user selection of a GUI menu entry, etc. Broadly, step 340 involves increasing visibility of the first image in the virtual window, and reducing visibility of the second image in the window.

FIG. 3B depicts an example of the foregoing fade operation. In this example, the user's hand 381 is applying force to an area 382 of the display surface 124. The circular rings of 382 are shown to illustrate the contact between the user's hand 381 and the display surface, however, these rings are not visible in practice. The fade window in this example is the entire display surface 124. Thus, the first image (an aerial photograph) is being faded-out and a second image (a roadmap of the same area) is being faded-in across the entire display 124.

Swipe Mode Application

Broadly, the swipe mode sequence 400 presents a first image, and response to user definition of a swipe window on the display screen, presents a second image within the window instead of the first image. The second image is introduced in situ, so that each point on the display screen continues to show the same spatial coordinates, whether inside or outside the swipe window. Optionally, the swipe window may be resizable in response to user input.

More specifically, steps 432, 434, 436 receive image layers, receive mapping, and present the first image in the same manner as steps 232, 234, 236 described above (FIG. 2B). As in FIG. 3A, in order to present the first image in step 436, an image-display mapping is developed between the first image and the display surface 124 to present the image with the desired scale.

Particular layers may be designated to be displayed in swipe mode by a user selection through a configuration menu, by default, or by another technique. As an example, the system 120 may keep track of layer attributes in a lookup table or other file containing data about layers, such that when slider mode is selected (see below) the system only displays those layers designated for that mode. All other layers not so designated are not displayed in swipe mode.

Step 438 recognizes when the user activates swipe mode. In one embodiment, this occurs by the user selecting swipe mode from a menu or other control interface. Alternatively, the system 120 may detect a predefined, user-applied swipe mode activation gesture distinguished by particular characteristics of touch position, velocity, and/or force.

If the system 120 does not detect activation of swipe mode, various other processing 442 is performed, such as waiting for performance of a this or a different gesture, providing an error message to the user, or other operations as discussed above in the context of steps 208a, 209, etc. of FIG. 2B.

Figure 4B:
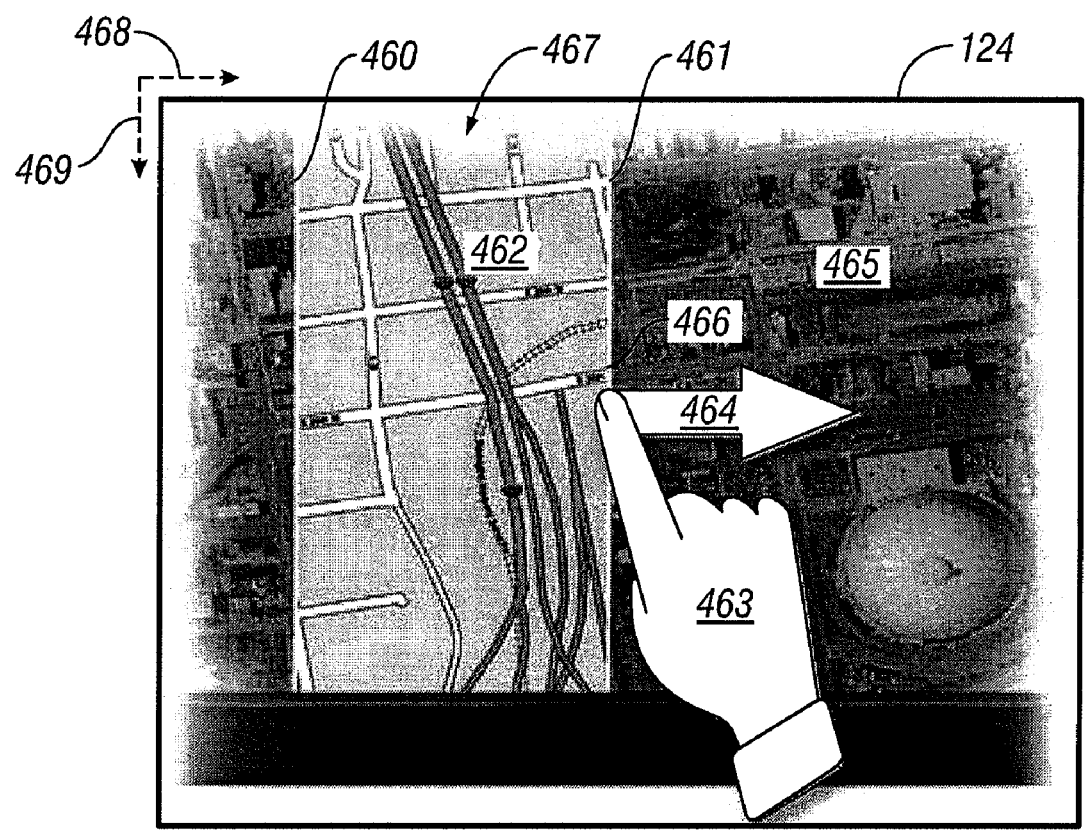
FIG. 4B is a diagram showing an example of user participation in a swipe mode.

When step 438 does detect swipe mode activation, step 440 integrates the first image (initially displayed) and second image (not initially displayed) according to the swipe mode, as follows. The second image is that image layer designated by the operations discussed above. First, the system 120 defines a swipe area (step 440a). In discussing the swipe area, it is helpful to refer to vertical (469) and lateral (468) directions of the display 124, as illustrated in FIG. 4B. To define the swipe area, the system 120 waits for occurrence of a first point of user contact on the display surface, then occurrence of a second point of contact away from said first location. As an alternative, the user may define the second point of contact in a different way—not by a new contact with the display 124, but by dragging the first point of contact to a new location.

The example of FIG. 4B depicts a user 463 touching the display surface 124 at a second point 466 of contact. Step 440a defines the swipe area as a vertical band 467 of the display surface 124 laterally bounded by the vertical lines 460-461 passing through first (not shown) and second 466 contact points. In the example of FIG. 4B, the vertical band 467 (swipe area) has the lateral boundaries 460-461, as defined by first (not shown) and second (466) contact points.

Optionally, upon sensing the first and second points of contact, the system 120 may update the display 124 to actually show the vertical lines 460-461 intersecting the respective contact points. Alternatively, display of these boundaries may be implied by the difference in appearance between the layers of imagery inside (462) and outside (465) the swipe area, as discussed below. Alternatively, the system 120 may recognize more than two borders to denote any desired rectangular area within the display, a circular area, a polygonal area, an irregular area designated by dragging a point of contact in a closed path on the display, etc.

Referring to FIGS. 4A-4B, after defining the swipe area 467, the system 120 in step 440b ceases display of the first image 465 within the swipe area 467 and instead displays the corresponding portion 462 of the second image. Consequently, from the user's perspective, the swipe area 467 has the effect of presenting a window through the first image into the second image's depiction of the same subject matter. Step 440c maintains display of the first image outside the swipe area 467.

In making the transition of steps 440b-440c, one implementation is to utilize the image-display mapping to determine which spatial coordinates of the first image are bounded by the swipe window (such as by latitude/longitude), and then to apply these spatial coordinates to identify the same region in the second image. Inside the swipe window, the first image is replaced by the identified region of the second image.

In the example of FIG. 4B, the first image 465 (maintained outside the swipe area 467) is a satellite photo, and the second image 462 is a roadmap. The portion 462 of the roadmap revealed by the swipe area 467 and the portion of the satellite photo 465 that is cut-out by the swipe area 467 corresponding to the same area of represented subject matter. Thus, despite performance of swipe mode, each point on the display continues to depict imagery corresponding to the same spatial coordinates regardless of which image is being shown.

In one implementation, steps 440a-440c may be performed as follows. The second image is displayed and a screen shot is taken and stored, for example in bitmap format. The transparency of the second image is then set to 100% so that it disappears from view, quickly enough that this may be imperceptible to the user, and the first image is displayed (i.e. its transparency is set to 0%, or completely opaque). Thereafter, the screen shot is utilized as the second image in the swipe area. If the boundary 461 is subsequently redefined 440a (discussed below), this is performed by varying a size of the earlier screen shot being presented. To display (440b) the second image in the swipe area 461 and display (440c) the first image outside the swipe area 461, the following implementation may be used, as one example. Namely, the system specifies a transparency value for the second image within the swipe window as 0% (fully opaque) and a transparency value for the first image outside the swipe window as 100% (fully transparent), and inputs these desired transparency values into an appropriate computer graphics program, mapping program, rendering program, or other such program for generating an output on the display 124. After performing steps 440b-440c, step 440 may optionally redefine the boundary 461 by repeating step 440a, responsive to user touch and drag movements seeking to alter boundaries of the swipe area. For example, the swipe area may be redefined (step 440a) whenever the user, after making the second point of contact, drags the contact point as illustrated by 464. Further, step 440a may detect a new point of contact occurring at one of the lateral boundaries 460-461 (or within a given threshold of distance), and in response, step 440a may modify the extent of the swipe area by moving that boundary responsive to initiating the new point of contact.

In addition to redefining the swipe area, step 440a may also redefine contents of the area. For instance, step 440 may respond to user operation of a GUI menu or other functional interface to designate a different image for display in the swipe area. In this case, steps 440b-440c are repeated in order to identify and thereafter present the relevant portion of the third, fourth, or other selected image in substitution of the image currently present in the swipe window.

In step 444, the swipe operation of step 440 may be discontinued. In one example, the system 120 removes the swipe area 467 and restores the first image 465 across the display surface 124. This may be performed, for example, in response to removal of user contact with the display surface, or other events such as: passage of a default or user-defined time, user performance of another prescribed gesture, user selection of a menu entry, etc.

Slider Mode Application

Broadly, the slider mode sequence 500 interpolates between different image layers according to position of a user-positioned slider tool. Each image is introduced in situ, so that each point on the display screen continues to show the same spatial coordinates, regardless of which image layer(s) are being shown.

Steps 532, 534, 536 receive image layers, receive mapping, and present a first image in the same manner as steps 232, 234, 236 described above (FIG. 2B). As with FIGS. 3A, 4A, in order to present the first image in step 536, an image-display mapping is developed between the first image and the display surface 124 to present the image with the desired scale.

In the illustrated example, the images of step 532 have prescribed positions in a given image sequence. For example, each image may represent (1) an image of certain subject matter as of a different time or date, (2) an image of a different floor plan of a multi-story building or ship, (3) an image of a different cross-sectional plan view of a multi-level circuit or machine, etc.

Step 537 recognizes when the user has activated the slider mode. In one embodiment, this occurs when the user selects a slider mode from a menu or other control interface. Alternatively, the system 120 may detect a predefined slider mode activation gesture by analyzing touch position, velocity, and/or force.

If the system 120 does not detect the slider mode movement in step 537, various other processing 542 is performed, such as waiting for performance of a this or a different gesture, providing an error message to the user, or other operations as discussed above in context of steps 208a, 209, etc. of FIG. 2B.

When slider mode is activated (step 537), the display 124 presents a slider tool in step 538. Broadly, the slider tool includes a bar, knob, button, dial, or other suitable GUI component. The presently described embodiment utilizes a linearly movable slider bar 560 illustrated in FIG. 5B. In this example, each designated linear position of the slider bar corresponds to a different image layer of step 532. In other words, the slider bar is set up so that different positions of the slider bar correspond to different positions in the prescribed sequence of images. The slider bar observes an appropriately convenient scale.

Next, in step 539 the system 120 analyzes user touch characteristics such as position, velocity, and/or force to determine whether the user has touched the slider bar, and dragged his/her finger (or stylus, or pen, etc.) in order to effectively push, pull, drag, or otherwise move the slider bar.

When step 539 detects user movement of the slider bar, then step 540 computes and displays the appropriate image. Whenever the slider bar occupies a position corresponding in the sequence to a single one of the images, step 540 presents that single image upon the display. For example, if there are ten images and ten slider positions, when the slider bar rests in position one, step 540 always presents image one.

Whenever the slider bar occupies a position without a corresponding single image, other tasks are performed. Namely, step 540 selects multiple images (each having a position in the given sequence with a predetermined relationship to slider tool position), and interpolates among the selected images. In one example, if the slider bar is between designated slider bar positions, step 540 selects the nearest two images to the slider bar position for interpolation. For example, if the slider bar rests between positions two and three, step 540 selects images two and three for interpolation. In one embodiment, a fixed weighting is always used (such as a 50% weighting of two images). In another embodiment, interpolation weighting is conducted in proportion to position of the slider bar. In this embodiment, the degree of interpolation varies in proportion to the position of the slider bar between established slider bar positions. For example, if the slider bar is 30% of the way between positions five and six, and there is one image per position, then step 540 interpolates between images five and six with a 30% weighting to image six and a 70% weighting to image five.

In one embodiment, interpolation may be implemented by the computer 126 acting in response to user input to specify a transparency value for each image layer between 0% (fully opaque) and 100% (fully transparent), and inputting the image layers desired transparency values into a computer graphics or mapping program. Optionally, step 540 may perform higher order interpolations. For example, the interpolation formula may consider the contribution of layers adjacent to the slider button (as described previously) along with the contribution of one or more nonadjacent layers as well. Alternatively, the interpolation formula may consider non-adjacent layers only. As another optional feature, in performing slider mode interpolation the system 120 may ignore specified "hidden" layers in accordance with user-specified settings. As an example, the system 120 may keep track of layer attributes in a lookup table or other file containing data about layers, such that when slider mode is selected the system only displays those layers designated for use in slider mode. When interpolating between layers, the "hidden" layers are ignored. This function may be implemented via menu, separate program, or other technique. Alternatively, instead of affirmatively specifying "hidden" layers, all layers may be assumed hidden unless the user affirmatively specifies them as visible for use in the slider mode.

Having computed the new (interpolated image), step 540 ultimately displays the resultant image. Thus, the effect of step 540 is for the system 120 to "morph" between the image layers in response to slider bar position. After step 540 presents the interpolated image, the routine 500 returns to step 538 to determine whether the user has moved the slider bar, and if so, to re-interpolate images and present the resultant image as appropriate. One particular utility of the technique 500 is to graphically demonstrate changes in an aerial or other scene over time. In this embodiment, there are multiple images, appropriate in number to the desired level of detail and accuracy. In this embodiment, where the slider bar 560 is movable along a line, the slider bar is accompanied by a stationary time bar 562 indicating various image dates and/or times. In the illustrated example, when the slider bar rests on a month for which an image is available, the system 120 presents the corresponding image 565 on the display 124. When the slider bar rests on a month for which an image is not available, or rests between months, then the system 120 mathematically interpolates between the nearest available images in proportion to the placement of the slider bar 560. For example, if the slider bar rests on June, and the nearest images correspond to May and July, then the system 120 interpolates between the May and July with a 50% weighting to each constituent image.

If the images correspond to evenly spaced times or dates, then the slider time bar represents the various layers with corresponding, evenly spaced, points along the length of the slider time bar. As depicted in the example of FIG. 5B, the system 120 recognizes leftward slider movements to present older imagery, and rightward slider bar movements to present newer imagery. Optionally, in performing the slider mode the system 120 may act to simulate various physical properties, such as inertia and friction, to more closely approximate the look and feel of manipulating a physical object. Simulation of inertia, friction, and the like are discussed in greater detail above. As one example, when the user moves the slider bar and terminates the gesture with nonzero velocity, the system 120 may simulate inertia to keep the slider in motion, blending between layers until the last layer is reached. Alternatively, once the last layer in the sequence is reached, the system 120 may perform a wraparound by resetting to the first image layer and continuing its motion. The system 120 may also simulate friction to slow the motion of the slider bar, once released. Responsive to a stop/slow command, such as touching the display, the system 120 halts or slows the motion.

OTHER EMBODIMENTS

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. At least one digital data storage media tangibly embodying a program of machine-readable instructions executable by a digital data processing apparatus to perform operations to manage an interactive display system including a touch-sensitive display, the operations comprising:
   establishing a predetermined first image and one or more predetermined second images, each of said images comprising an alternate depiction of shared subject matter having predefined spatial coordinates;
   presenting the first image upon the touch-sensitive display;
   responsive to prescribed user input including contact with the touch-sensitive display, performing further operations comprising:
      modifying presentation of the first image upon the touch-sensitive display by integrating a region of at least one of the secondary images into the display;
      where each integrated region depicts subject matter of substantially identical spatial coordinates as a counterpart region of the first image upon which said integration occurs; and
      where each point on the touch-sensitive display that depicts any one or a combination of the images always depicts subject matter of unchanging spatial coordinates regardless of which of the images or combination of images is currently being presented.

2. The media of claim 1, where the first image comprises a depiction of specific subject matter, and where each of the secondary images includes an alternate depiction of said subject matter.

3. The media of claim 2, where at least one of the secondary images comprises a depiction of the specific subject matter at a different time than the first image.

4. The media of claim 2, where at least one of the secondary images comprises a plan view of a different cross-sectional level of the subject matter than the first image.

5. The media of claim 2, where at least one of the secondary images comprises a diagram limited to a selected aspect of the specific subject matter.

6. The media of claim 1, further comprising operations of receiving one or more mappings defining correspondence between the images and the spatial coordinates.

7. At least one digital data storage media tangibly embodying a program of machine-readable instructions executable by a digital data processing apparatus to perform operations to manage an interactive display system including a touch-sensitive display, the display presenting a first one of multiple predetermined images, each of said images comprising an alternate depiction of shared subject matter having predefined spatial coordinates, the operations comprising:
   responsive to prescribed user input including contact with the touch-sensitive display, performing operations comprising:
      modifying presentation of the first image upon the touch-sensitive display by integrating a region of at least one of the secondary images into the display;
      where each integrated region depicts subject matter of substantially identical spatial coordinates as a counterpart region of the first image upon which said integration occurs; and
      where each point on the touch-sensitive display that depicts any one or a combination of the images always depicts subject matter of unchanging spatial coordinates regardless of which of the images or combination of images is currently being presented.

8. At least one digital data storage media tangibly embodying a program of machine-readable instructions executable by a digital data processing apparatus to perform operations to manage an interactive display system including a touch-sensitive display, the operations comprising:
   establishing a predetermined first image and one or more predetermined second images, each of said images comprising an alternate depiction of shared subject matter having predefined spatial coordinates;
   presenting the first image upon the touch-sensitive display;
   responsive to prescribed user contact upon the touch-sensitive display, performing operations comprising:
      reducing visibility of a fade-out region of the first image;
      substantially simultaneously increasing visibility of a fade-in region of one of the secondary images;
      where the fade-out region and fade-in regions represent substantially identical spatial coordinates; and
      where each point on the touch-sensitive display that depicts any one or a combination of the images always depicts subject matter of unchanging spatial coordinates regardless of which of the images or combination of images is currently being presented.

9. At least one digital data storage media tangibly embodying a program of machine-readable instructions executable by a digital data processing apparatus to perform operations to manage an interactive display system including a touch-sensitive display, the operations comprising:
   establishing a predetermined first image and one or more predetermined second images, each of said images comprising an alternate depiction of shared subject matter having predefined spatial coordinates;
   where the images have a defined order in a series;
   presenting the first image upon the touch-sensitive display;
   responsive to prescribed user contact upon the touch-sensitive display, performing operations comprising:
      defining a window upon the touch-sensitive display, the window representing an extent of represented spatial coordinates; and
      within the window, varying the display to substantially exclusively show a region of one of the images whose order in the series is proportional to force of user contact upon the display, the shown region corresponding to spatial coordinates represented by the defined window.

10. At least one digital data storage media tangibly embodying a program of machine-readable instructions executable by a digital data processing apparatus to perform operations to manage an interactive display system including a touch-sensitive display, the operations comprising:
   establishing a predetermined first image and one or more predetermined second images, each of said images comprising an alternate depiction of shared subject matter having predefined spatial coordinates;
   presenting the first image upon the touch-sensitive display;
   responsive to detecting occurrence of at least first and second contact sites on the touch-sensitive display, defining a swipe area upon the touch-sensitive display, the swipe area bounded by the first and second contact sites;
   within the swipe area, ceasing presentation of the first image and instead presenting a region of one of the secondary images whose spatial coordinates substantially match spatial coordinates of the first image within the swipe area;

where each point on the touch-sensitive display that depicts any one or a combination of the images always depicts subject matter of unchanging spatial coordinates regardless of which of the images or combination of images is currently being presented; and maintaining display of the first image outside the swipe area.

11. At least one digital data storage media tangibly embodying a program of machine-readable instructions executable by a digital data processing apparatus to perform operations to manage an interactive display system including a touch-sensitive display, the operations comprising:

establishing a predetermined first image and one or more predetermined second images, each of said images comprising an alternate depiction of shared subject matter having predefined spatial coordinates;

responsive to the prescribed user input, presenting a slider tool upon the touch-sensitive display; and combining selected ones of the images and presenting the combined image on the touch-sensitive display, where the selected images are combined such that each point on the touch-sensitive display that depicts any one or a combination of the images always depicts subject matter of unchanging spatial coordinates regardless of which of the images or combination of images is currently being presented, and where the combining operation weights the images in proportion to position of the slider tool.

12. A computer-implemented process of managing an interactive display system including a touch-sensitive display, the process comprising the operations set forth in any of claim 1, 2, 3, 4, 6, 5, 7, 8, 9, 10, or 11.

13. A computer driven interactive display apparatus, comprising:

a touch-sensitive display; and a digital data processing machine programmed to perform the operations set forth in any of claim 1, 2, 3, 4, 6, 5, 7, 8, 9, 10, or 11.

* * * * *